(12) United States Patent
Yamasaki

(10) Patent No.: US 9,380,182 B2
(45) Date of Patent: Jun. 28, 2016

(54) IMAGE READING DEVICE, AND IMAGE FORMING APPARATUS INCLUDING THE SAME

(71) Applicant: KYOCERA Document Solutions Inc., Osaka-shi, Osaka (JP)

(72) Inventor: Shunsuke Yamasaki, Osaka (JP)

(73) Assignee: KYOCERA Document Solutions Inc., Osaka-shi (JP)

(*) Notice: Subject to any disclaimer, the term of this patent is extended or adjusted under 35 U.S.C. 154(b) by 0 days.

(21) Appl. No.: 14/719,138

(22) Filed: May 21, 2015

(65) Prior Publication Data

US 2015/0341519 A1 Nov. 26, 2015

(30) Foreign Application Priority Data

May 26, 2014 (JP) ................................ 2014-108053

(51) Int. Cl.
*H04N 1/04* (2006.01)
*H04N 1/024* (2006.01)
*H04N 1/10* (2006.01)
*H04N 1/00* (2006.01)

(52) U.S. Cl.
CPC ............... *H04N 1/0249* (2013.01); *H04N 1/00* (2013.01); *H04N 1/00557* (2013.01); *H04N 1/024* (2013.01); *H04N 1/10* (2013.01); *H04N 1/1061* (2013.01)

(58) Field of Classification Search
CPC ............. H04N 1/0249; H04N 1/1061; H04N 1/00557; H04N 1/024; H04N 1/10
USPC .......................................... 358/497, 498, 474
See application file for complete search history.

(56) References Cited

U.S. PATENT DOCUMENTS

| 6,687,027 | B1* | 2/2004 | Fang | .................... H04N 1/1017 358/471 |
| 8,928,953 | B2* | 1/2015 | Shibata | .............. H04N 1/00559 358/474 |

FOREIGN PATENT DOCUMENTS

JP 2007212810 A 8/2007

* cited by examiner

*Primary Examiner* — Houshang Safaipour
(74) *Attorney, Agent, or Firm* — Alleman Hall McCoy Russell & Tuttle LLP

(57) ABSTRACT

An image reading device includes a slide member, a guide rail, an engagement mechanism, a link member, and a link mechanism. The slide member abuts on and separates from a bottom portion of the reading unit, and when abutting on the bottom portion, supports the bottom portion of the reading unit. The guide rail is provided on a scanner frame and supports the slide member. The engagement mechanism changes in attitude between an engagement attitude to make an engagement between the engagement mechanism and a drive belt of a reading unit, and a release attitude to release the engagement. The link member links the slide member with the engagement member. When the slide member approaches the reading unit, the link mechanism causes the engagement mechanism to be in the engagement attitude, and when the slide member separates, the link mechanism causes the engagement mechanism to be in the release attitude.

4 Claims, 9 Drawing Sheets

IMAGE READING DEVICE, AND IMAGE FORMING APPARATUS INCLUDING THE SAME

INCORPORATION BY REFERENCE

This application is based upon and claims the benefit of priority from the corresponding Japanese Patent Application No. 2014-108053 filed on May 26, 2014, the entire contents of which are incorporated herein by reference.

BACKGROUND

The present disclosure relates to an image reading device for reading an image from a document sheet by the flat bed method, and an image forming apparatus including the image reading device.

There is known an image reading device which includes an image reading portion for reading an image from a document sheet by the flat bed method. The image reading portion includes a reading unit which includes a reading optical system composed of a light source, a mirror and the like for reading an image from a document sheet. The image reading portion reads the image of the document sheet as an electric signal by causing the reading unit to move in a sub scanning direction to scan the reading surface of the document sheet.

As a drive mechanism for moving such a reading unit in the sub scanning direction, there is known a drive mechanism which is based on the belt drive method. The drive mechanism of this type includes a pair of pulleys, a drive belt, and a drive motor. The pair of pulleys are disposed at positions that are separated by a predetermined distance in the sub scanning direction. The drive belt has an endless shape and is extended in suspension between the pair of pulleys. The drive motor rotationally drives one of the pair of pulleys. The reading unit is attached to the drive belt. When the one of the pair of pulleys is rotationally driven by the drive motor, the drive belt runs in the sub scanning direction. This allows the reading unit attached to the drive belt to run in the sub scanning direction.

SUMMARY

An image reading device according to an aspect of the present disclosure includes a reading unit, a slide member, a guide rail, a transmission member, an engagement mechanism, and a link mechanism. The reading unit has an optical element for reading an image from a document sheet. The slide member is configured to abut on and separate from a bottom portion of the reading unit, and when abutting on the bottom portion, supports the bottom portion of the reading unit. The guide rail is provided on a device main body, and is configured to support the slide member such that the reading unit supported by the slide member can slide in a predetermined movement direction. The transmission member is extended long in suspension along the movement direction and configured to give a force that causes the reading unit to slide, to the reading unit. The engagement mechanism is attached to the reading unit and configured to change in attitude between an engagement attitude to make an engagement between the engagement mechanism and the transmission member, and a release attitude to release the engagement between the engagement mechanism and the transmission member. The link mechanism includes a link member that links the slide member with the engagement member, and is configured to, when the slide member relatively approaches the reading unit, cause the engagement mechanism to be in the engagement attitude, and when the slide member relatively separates from the reading unit, cause the engagement mechanism to be in the release attitude.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
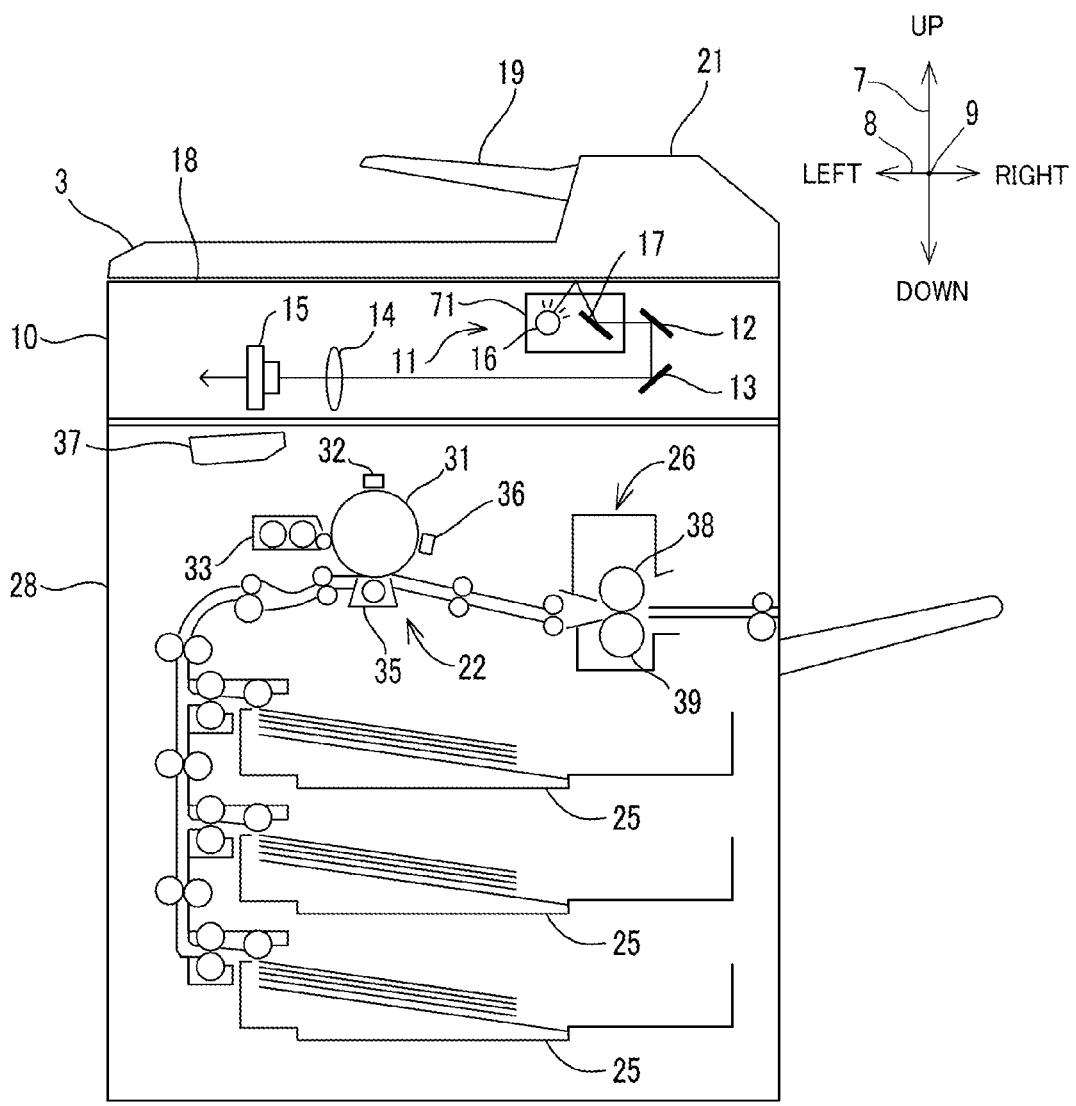
FIG. 1 is a schematic diagram showing the configuration of an image forming apparatus according to an embodiment of the present disclosure.

In the following, an image forming apparatus 1 according to an embodiment of the present disclosure is described with reference to the drawings. It is noted that for the sake of explanation, an up-down direction 7 is defined based on the state (the state shown in FIG. 1) where the image forming apparatus 1 is installed on a flat surface. In addition, a direction perpendicular to the paper plane of FIG. 1 is defined as a front-rear direction 9, with the front side of the paper plane of FIG. 1 being the front side of the image forming apparatus. Furthermore, a left-right direction 8 is defined by viewing the image forming apparatus 1 from the near side (front side) of the paper plane of FIG. 1.

The image forming apparatus 1 is a multifunction peripheral having a plurality of functions such as an image reading function, a facsimile function, and an image forming function.

As shown in FIG. 1, the image forming apparatus 1 includes, as major structural elements, a document sheet cover 3, an image reading portion 10 (an example of the image reading device of the present disclosure), an ADF (Automatic Document Feeder) 21, an image forming portion 22, an operation display portion 24 (see FIG. 2), a sheet feed device 25, a fixing device 26, and a control portion (not shown) which comprehensively controls the image forming apparatus 1. These structural elements are attached to a housing 28 constituting an external frame (not shown), an internal frame and the like of the image forming apparatus 1.

The image forming portion 22 executes a process (image forming process) of forming an image on a print sheet based on the electrophotography. The image forming portion 22 prints an image on a print sheet based on image data and print conditions included in a print job that has been transported. As shown in FIG. 1, the image forming portion 22 includes a photoconductor drum 31, a charging device 32, a developing device 33, a transfer device 35, an electricity removing device 35, an exposure device 37 and the like.

The fixing device 26 includes a heating roller 38 and a pressure roller 39 which is pressed against the heating roller 38. When a print sheet passes through the fixing device 26, a toner image on the print sheet is heated by the heating roller 38 and the toner is fused, and the print sheet is pressed by the pressure roller 39. This allows an image to be formed on the print sheet.

The ADF 21 conveys one or more document sheets set on a document sheet setting portion 19 one by one by using a plurality of conveyance rollers such that each document sheet passes through a predetermined automatic document sheet reading position rightward in the left-right direction 8, wherein the automatic document sheet reading position is defined on a contact glass 18. In the image reading portion 10, during the conveyance of the document sheet by the ADF 21, a reading unit 11 is moved to a position below the automatic document sheet reading position, and the image is read from the moving document sheet.

Figure 2:
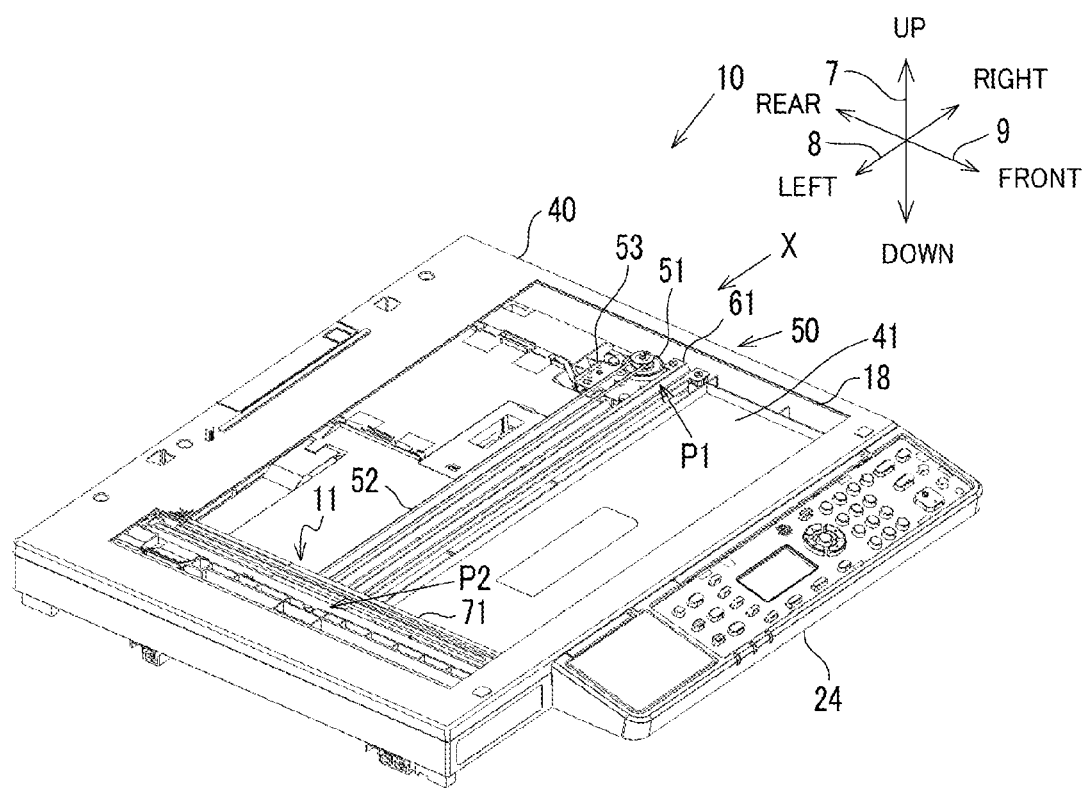
FIG. 2 is a perspective view showing the configuration of an image reading portion.

The image reading portion 10 executes an image reading process of reading image data from a document sheet. As shown in FIG. 2, the image reading portion 10 includes a box-like scanner frame 40 which constitutes an apparatus main body. The scanner frame 40 stores the reading unit 11, a mirror 12, a mirror 13, an optical lens 14, and a CCD 15. The contact glass 18 is attached to the scanner frame 40. As shown in FIG. 1, the document sheet cover 3 is provided on the image reading portion 10. Although not shown in FIG. 1, the document sheet cover 3 is pivotally supported by the image reading portion 10 at the rear in the front-rear direction 9. With a pivotal operation of the document sheet cover 3, the contact glass 18 disposed on the upper surface of the image reading portion 10 is opened or closed.

The reading unit 11 includes a housing 71. The housing 71 is long in the front-rear direction 9. In the present embodiment, the front-rear direction 9 corresponds to a main scanning direction. As shown in FIG. 1, optical elements such as an LED light source 16 and a mirror 17 are provided in the housing 71. The reading unit 11 is configured to be moved in the left-right direction 8 by a driving mechanism 50 that includes a driving motor 53 that is a stepping motor or the like (see FIG. 2, FIG. 3). In the present embodiment, the left-right direction 8 corresponds to a sub scanning direction. The mirror 17 reflects, toward the mirror 12, light which was irradiated from the LED light source 16 and reflected on the surface of the document sheet or on the rear surface of the document sheet cover 3. The light reflected on the mirror 17 is guided into the optical lens 14 by the mirrors 12 and 13. The optical lens 14 condenses incident light and makes the condensed light incident on the CCD 15. The CCD 15 is a photoelectric converting element that converts received light into an electric signal (a voltage signal) that corresponds to the amount of light (intensity of brightness) of the received light, and outputs the electric signal to the control portion (not shown). In this way, the reading unit 11 includes optical elements for reading an image from a document sheet.

The image reading portion 10 supports two reading methods for the reading. According to the first reading method, the ADF 21 conveys the document sheet so as to pass through a predetermined document sheet reading position, and the reading unit 11 reads the image of the document sheet at the document sheet reading position as the document sheet passes through the reading position. This reading method is also called a sheet-through reading method. Specifically, the first reading method is performed as follows. First, a document sheet is set on the contact glass 18 in the state where the upper surface of the image reading portion 10 is closed by the ADF 21. Subsequently, when the image reading instruction is input, the reading unit 11 is moved to a predetermined position below the document sheet reading position. After this, while the ADF 21 moves the document sheet so as to pass through the document sheet reading position rightward in the left-right direction (sub scanning direction) 8, a line of light is continually irradiated from the LED light source 16. Light reflected on the document sheet or the rear surface of the ADF 21 is guided into the CCD 15 via the mirrors 17, 12 and 13 and the optical lens 14.

According to the second reading method, the reading unit 11 reads the image of a document sheet placed on the upper surface of the contact glass 18 while the reading unit 11 is being moved rightward in the left-right direction (sub scanning direction) 8 from a predetermined home position which is, for example, on the left side of FIG. 1. This reading method is also called a stationary document sheet reading method or a flat bed method. Specifically, the second reading method is performed as follows. First, a document sheet is placed on the contact glass 18, and the upper surface of the image reading portion 10 is closed by the ADF 21. Subsequently, when the image reading instruction is input, the reading unit 11 is moved rightward in the left-right direction (sub scanning direction) 8, while a line of light is continually irradiated from the LED light source 16. Light reflected on the document sheet or the rear surface of the ADF 21 is guided into the CCD 15 via the mirrors 17, 12 and 13 and the optical lens 14.

Figure 3:
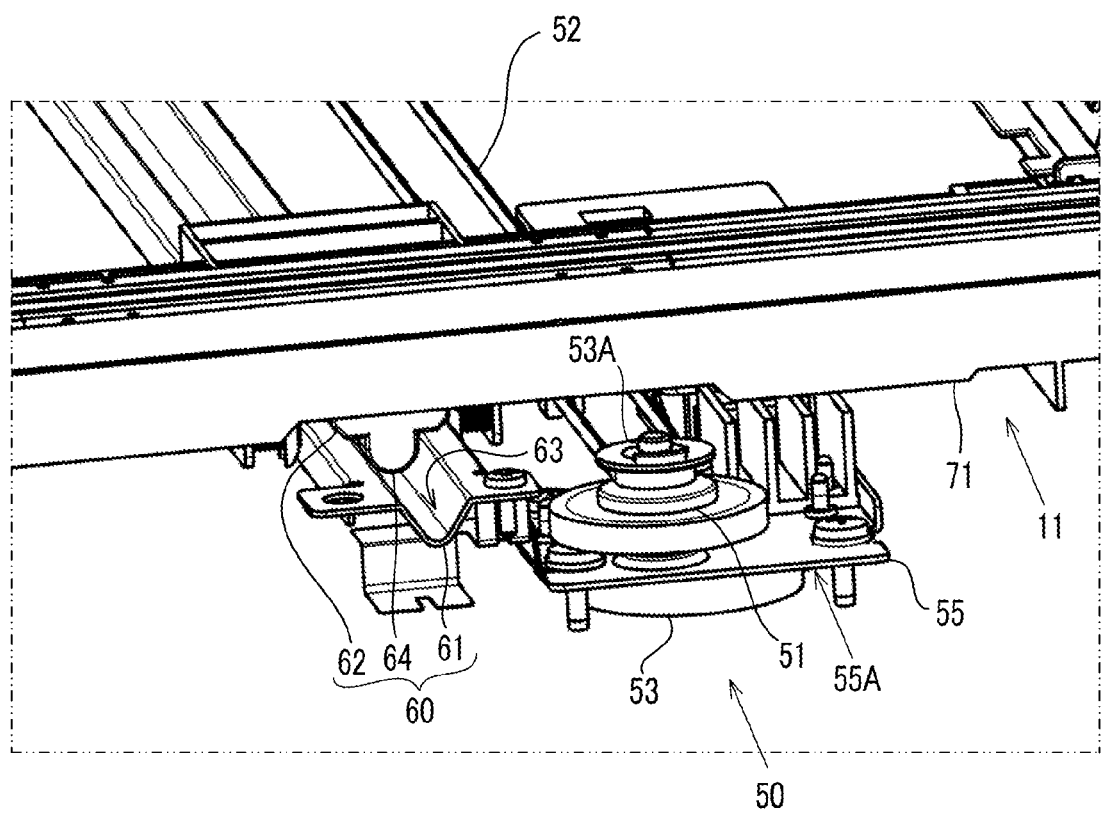
FIG. 3 is a perspective view showing the configuration of some elements such as a drive mechanism for driving a reading unit, in the state where the reading unit is positioned proximate to the drive motor, viewed from a direction indicated by the arrow X in FIG. 2.

The driving mechanism 50 is configured to cause the reading unit 11 to move in the left-right direction (sub scanning direction) 8. As shown in FIG. 2 and FIG. 3, the driving mechanism 50 includes a pair of pulleys 51, a drive belt 52, and a drive motor 53. The pulleys 51 are disposed at positions (positions indicated by arrows P1 and P2) that are respectively in the vicinity of opposite end portions of the scanner frame 40 in the left-right direction (sub scanning direction) 8. The scanner frame 40 includes a bottom plate 41. A bracket 55 is attached to the bottom plate 41. The drive motor 53 is attached to a lower surface 55A of the bracket 55. An output shaft 53A of the drive motor 53 extends upward from the lower surface 55A and vertically passes through the bracket 55. One pulley 51 is connected with the output shaft 53A at a part protruding from the bracket 55. With this configuration, the pulleys 51 rotate in a horizontal plane. It is noted that, in FIG. 2, only the one pulley 51 is shown, and the other pulley 51 is not shown since it is hidden by the reading unit 11. In the following description, the pulley 51 shown in the drawing is referred to as a pulley 51A. Furthermore, in FIG. 3, the bottom plate 41 is omitted. The drive belt 52 is a belt having an endless shape. The drive belt 52 is wound around the circumferential surfaces of the pair of pulleys 51, and extended in suspension along the left-right direction (sub scanning direction) 8. With this configuration, the drive belt 52 runs in the left-right direction (sub scanning direction) 8, except at the pulleys 51. The reading unit 11 is attached to the drive belt 52 in an attachable/detachable manner. When the reading unit 11 is attached to the drive belt 52, the reading unit 11 slides (runs) in the left-right direction (sub scanning direction) 8 as the drive belt 52 runs. In this way, the driving mechanism 50 drives the reading unit 11 to slide in the left-right direction (sub scanning direction) 8. That is, the drive belt 52 gives a force that causes the reading unit 11 to slide, to the reading unit 11. The drive belt 52 is an example of the long transmission member of the present disclosure, and corresponds to the belt. It is noted that a wire can be adopted as the transmission member.

Conventionally, the reading unit 11 may be attached to the drive belt 52 by the press-fitting or snap fit. In that case, when the reading unit 11 needs to be removed from the image reading portion 10 for some reason, it is difficult to remove the reading unit 11 with the drive belt 52 being wound around the pulleys 51. As a result, it was necessary to remove the drive belt 52 from the pulleys 51 in the state where the reading unit 11 is attached to the drive belt 52. In addition, when the reading unit 11 is attached to the image reading portion 10, the reading unit 11 is attached, in the reversed state, to the drive belt 52 by the press-fitting or snap fit, and then the drive belt 52 is wound around the pulleys 51. Such an attachment/detachment of the reading unit 11 with respect to the image reading portion 10 is very troublesome and its working efficiency is poor.

As a result, in the present embodiment, the following configuration is adopted to improve the working efficiency of the attachment/detachment of the reading unit 11 with respect to the image reading portion 10.

Figure 4:
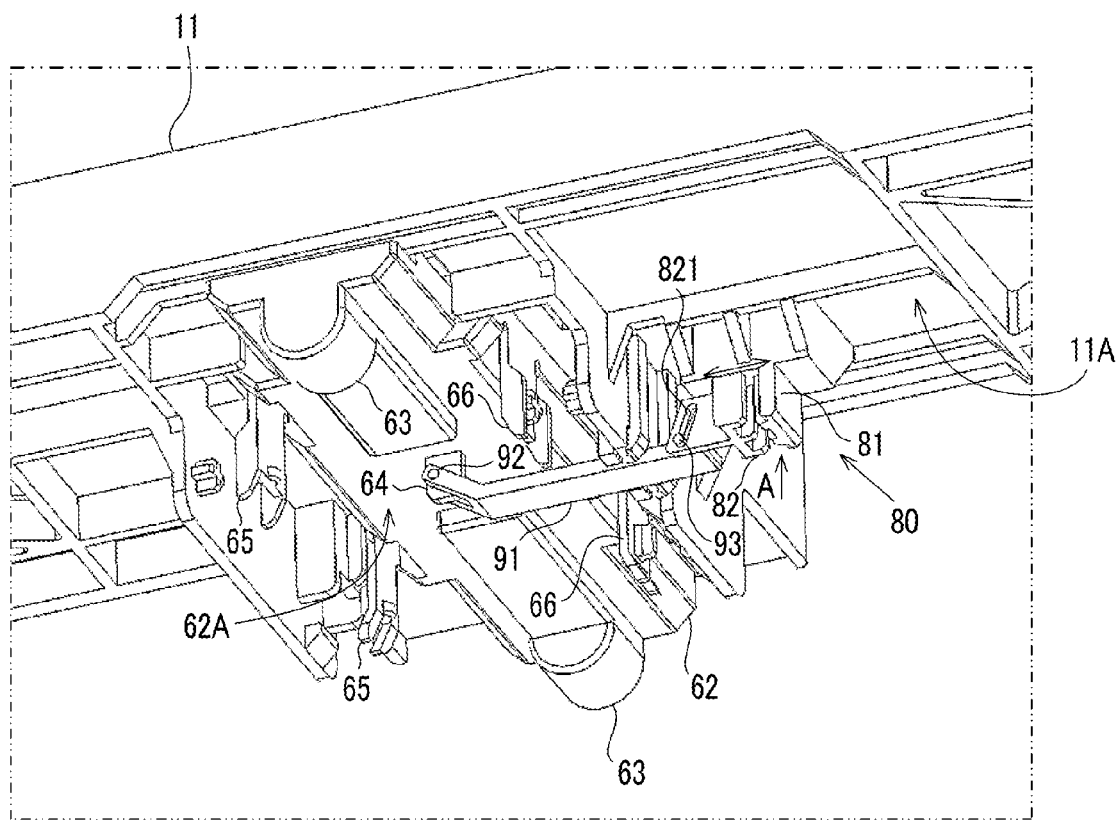
FIG. 4 is a perspective view showing the configuration of the reading unit, a slider, an engagement mechanism, and a link mechanism, in the state where the slider is abutting on the reading unit, viewed from diagonally below.
Figure 5:
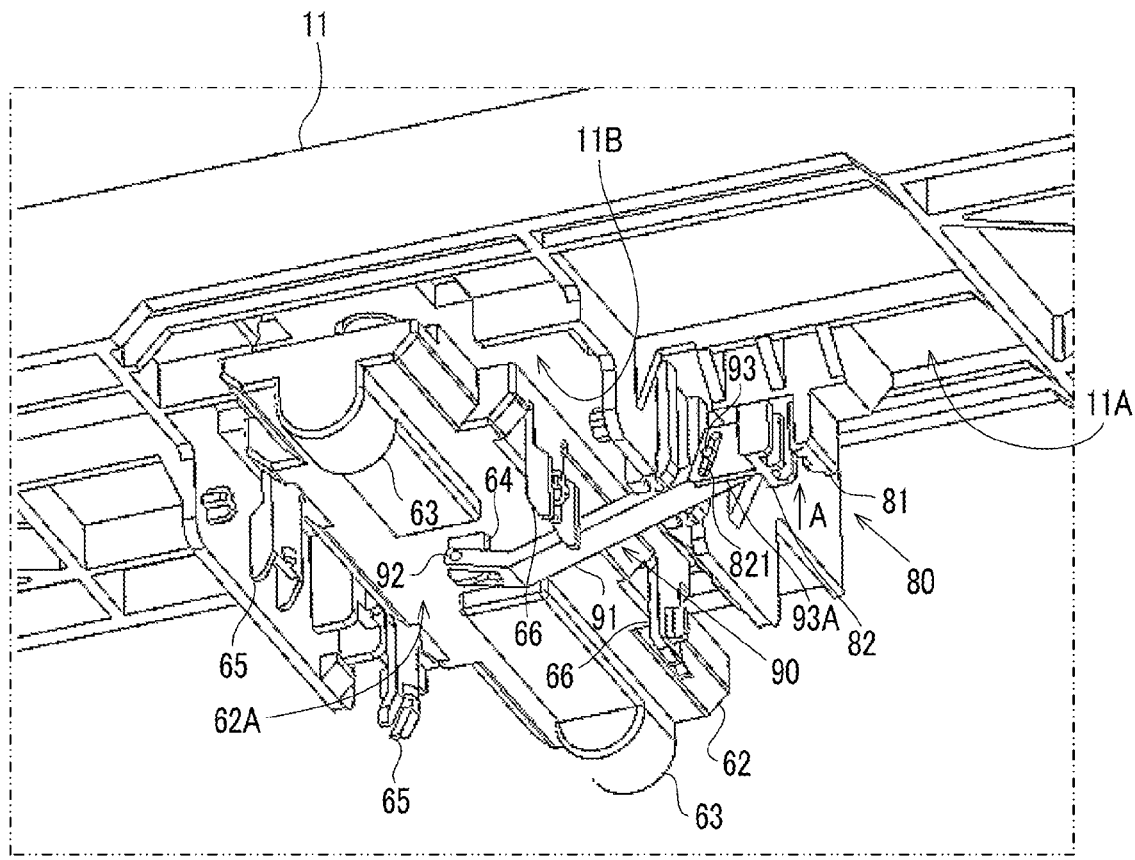
FIG. 5 is a perspective view showing the configuration of the reading unit, slider, engagement mechanism, and link mechanism, in the state where the slider is separated from the reading unit, viewed from diagonally below.

As shown in FIGS. 3-5, the image reading portion 10 includes a guide mechanism 60. The guide mechanism 60 includes a guide rail 61 and a slider 62 (an example of the slide member of the present disclosure). As shown in FIG. 2, the guide rail 61 is disposed at substantially the center in the front-rear direction 9 inside the scanner frame 40 to be parallel to the drive belt 52, the scanner frame 40 constituting the apparatus main body. As shown in FIG. 3, the guide rail 61 includes a portion formed in the shape of letter V in cross section.

The slider 62 is provided below the reading unit 11. The slider 62 is configured to abut on and separate from a bottom portion 11A of the reading unit 11. FIG. 4 shows an abutting state in which the slider 62 is abutting on the bottom portion 11A of the reading unit 11. FIG. 5 shows a separation state in which the slider 62 is separated from the bottom portion 11A of the reading unit 11. The slider 62 includes a projection 63 at a lower part. The lower end portion of the projection 63 is semicircular in cross section.

The reading unit 11 is mounted in the image reading portion 10 so as to be slidable in the left-right direction 8. In this state, the reading unit 11 is placed on the guide rail 61. At this time, the slider 62 is positioned between the reading unit 11 and the guide rail 61. Specifically, the slider 62 is fitted in an indent portion 11B (see FIG. 5) formed on the bottom portion 11A of the reading unit 11, and abutting on the bottom portion 11A. The guide rail 61 supports the slider 62 such that the reading unit 11 can slide in a predetermined movement direction. The slider 62 slidably contacts the guide rail 61 while abutting on and supporting the bottom portion 11A of the reading unit 11 that slides in the direction in which the drive belt 52 extends, namely the left-right direction (sub scanning direction) 8. That is, the slider 62 integrally slides with the reading unit 11 in the left-right direction (sub scanning direction) 8.

The slider 62 includes a plurality of restriction portions 65 and a plurality of restriction portions 66, each extending vertically downward. The restriction portions 65 and restriction portions 66 are aligned along the guide rail 61, separated from each other by a distance equivalent with the width of the guide rail 61. The guide rail 61 can be fitted in between the restriction portions 65 and the restriction portions 66. When the guide rail 61 is fitted in between the restriction portions 65 and the restriction portions 66, the restriction portions 65 and the restriction portions 66 restrict the displacement of the slider 62 in the width direction of the guide rail 61, namely, in the front-rear direction 9 (main scanning direction).

The image reading portion 10 includes an engagement mechanism 80. The engagement mechanism 80 is provided on the bottom portion 11A of the reading unit 11. The engagement mechanism 80 is disposed adjacent to the indent portion 11B in the longitudinal direction of the reading unit 11 (front-rear direction 9). The engagement mechanism 80 includes a first clamping member 81 and a second clamping member 82 as a pair. The first clamping member 81 and the second clamping member 82 are aligned to face each other in the longitudinal direction of the reading unit 11 (front-rear direction 9), namely, in the width direction of the drive belt 52, to face each other. The first clamping member 81 and the second clamping member 82 are configured to approach and separate from each other. Specifically, in the present embodiment, the first clamping member 81 is provided to be fixed to the bottom portion 11A of the reading unit 11. The second clamping member 82 is configured to move in a direction perpendicular to the movement direction of the reading unit 11, at the bottom portion 11A of the reading unit 11. The mechanism for allowing the second clamping member 82 to move in the longitudinal direction of the reading unit 11 is described below.

Figure 6A:
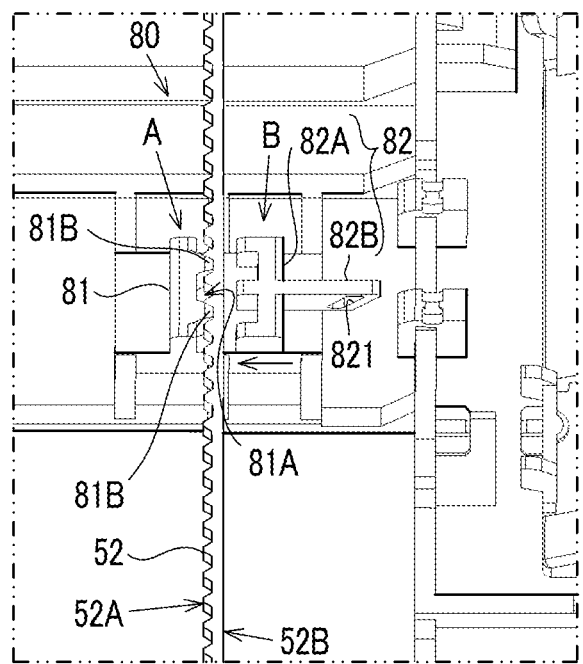
FIG. 6A is a diagram showing the configuration of the engagement mechanism in the state before a first clamping member and a second clamping member clamp the drive belt.
Figure 6B:
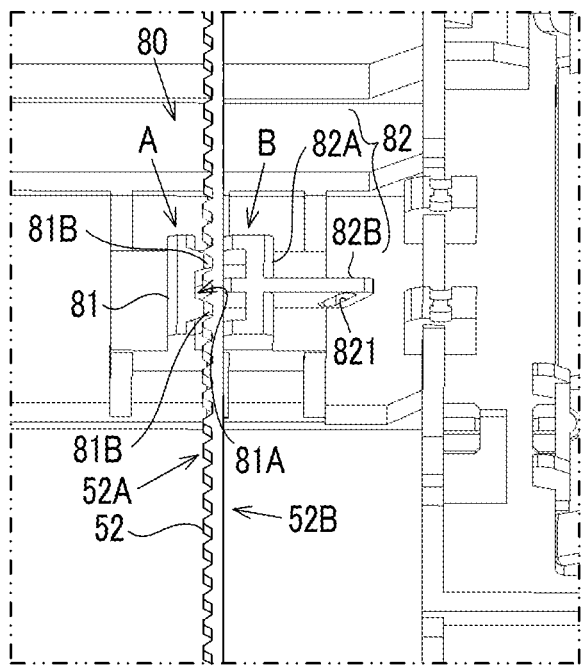
FIG. 6B is a diagram showing the configuration of the engagement mechanism in the state where the first clamping member and the second clamping member are clamping the drive belt.

As shown in FIGS. 6A and 6B, a surface 81A of the first clamping member 81 facing the second clamping member 82 includes trapezoid teeth 52A which are indicated by arrow A. The second clamping member 82 includes comb teeth 82A (see arrow B). The comb teeth 82A are made by forming a surface of the second clamping member 82 facing the first clamping member 81 into the shape of comb teeth. The drive belt 52 is a belt with teeth. Specifically, a surface of the drive belt 52 facing the first clamping member 81 is formed in the shape of trapezoid teeth. Another surface of the drive belt 52 facing the second clamping member 82 is formed in a flat shape. With the configuration where the first clamping member 81, the second clamping member 82 and the drive belt 52 are formed in the above-described shapes, the engagement among the first clamping member 81, the second clamping member 82 and the drive belt 52 is strong.

The second clamping member 82 includes an extension portion 82B. The extension portion 82B extends from the rear surface of the comb teeth 82A (a surface opposite to the first clamping member 81) in the longitudinal direction of the reading unit 11. The extension portion 82B includes a long hole portion 821 that is described below.

The image reading portion 10 includes a link mechanism 90. The link mechanism 90 includes a link member 91. The link member 91 has the shape of a stick, and links the slider 62 with the second clamping member 82. An attachment piece 64, extending downward, is provided on a lower surface 62A of the slider 62 (see FIG. 4, FIG. 5). One end of the link member 91 is pivotally supported by a sway support shaft 92 so as to be swayable. At the other end of the link member 91, an engagement pin 93 is provided so as to extend in the same direction as the sway support shaft 92. It is noted that the link member 91 is bent at a predetermined angle (for example, an angle in the range from 120° C. to 150° C.) in the vicinity of the portion that is pivotally supported by the sway support shaft 92.

As described above, the long hole portion 821 is formed in the extension portion 82B of the second clamping member 82. As shown in FIG. 4 and FIG. 5, the long hole portion 821 is a hole that extends diagonally downward from the top end that is closest to the reading unit 11 toward the slider 62. The engagement pin 93 of the link member 91 is inserted into the long hole portion 821.

Next, a description is given of the act of the engagement mechanism 80 and the link mechanism 90 in the case where the reading unit 11 is detached from the image reading portion 10, and the case where the image reading portion 10 is attached to the image reading portion 10.

Figure 7A:
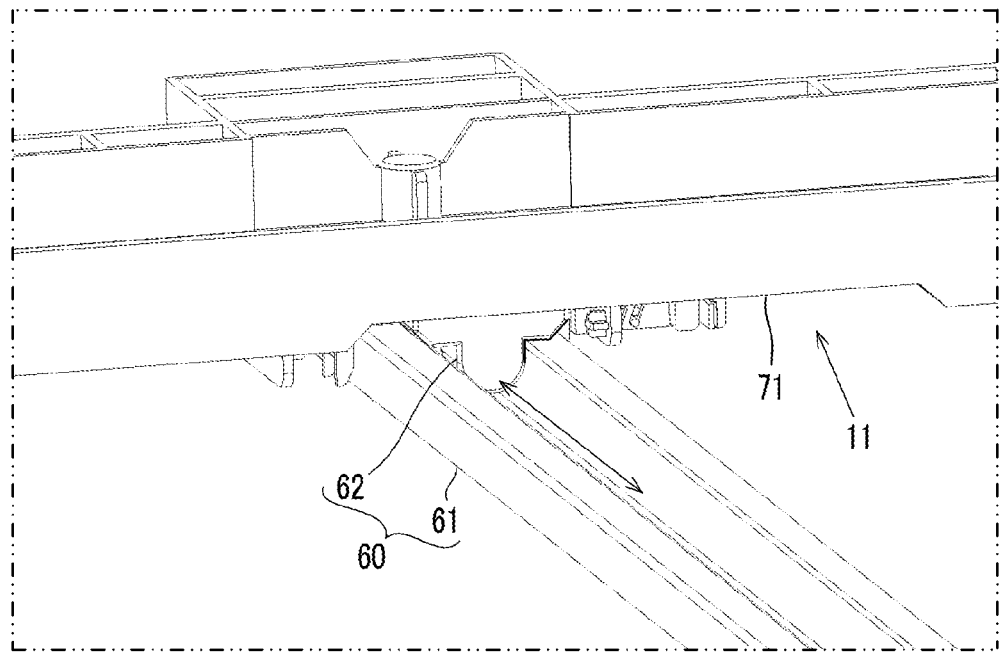
FIG. 7A is a perspective view showing the state where the reading unit is placed on the guide rail.
Figure 8:
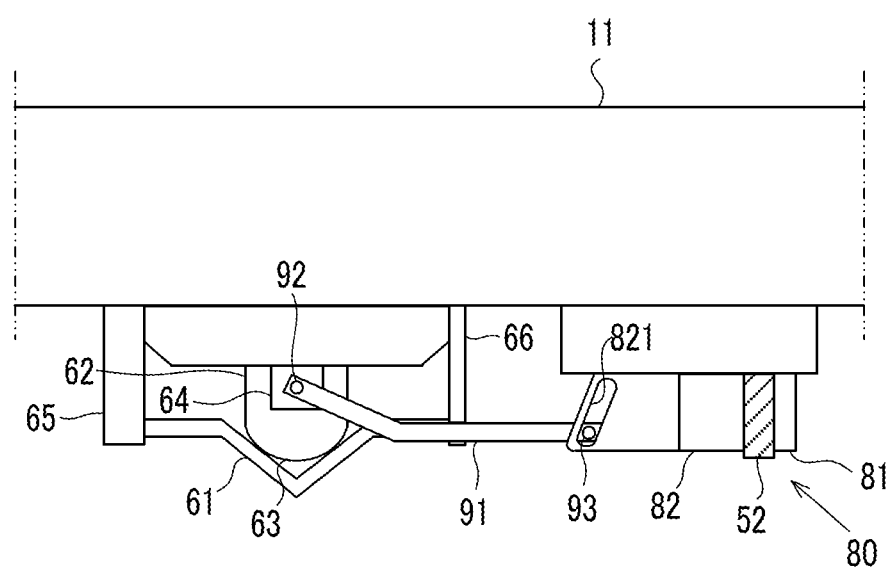
FIG. 8 is a schematic diagram showing the state where the reading unit is placed on the guide rail.

As shown in FIG. 7A and FIG. 8, when the reading unit 11 is attached to the image reading portion 10, the reading unit 11 is placed on the guide rail 61. At this time, the slider 62 is fitted in the indent portion 11B that is formed on the bottom portion 11A of the reading unit 11. The guide rail 61 supports the slider 62 in this state.

In the above-described state, the link member 91 is in a substantially horizontal attitude, and the second clamping member 82 is separated from the slider 62 to the farthest position therefrom. That is, the first clamping member 81 and the second clamping member 82 are closest to each other and clamp the drive belt 52 (see FIG. 6B, FIG. 8). The first clamping member 81 and the second clamping member 82 clamp the drive belt 52 in this way. With the first clamping member 81 and the second clamping member 82 clamping the drive belt 52, the engagement mechanism 80 is engaged with the drive belt 52. This allows the reading unit 11 to be connected with the drive belt 52. The above-described attitude of the engagement mechanism 80 in which the first clamping member 81 and the second clamping member 82 are closest to each other, corresponds to the engagement attitude. That is, when the link member 91 is in a substantially horizontal attitude, the engagement mechanism 80 is in an engagement attitude.

Figure 7B:
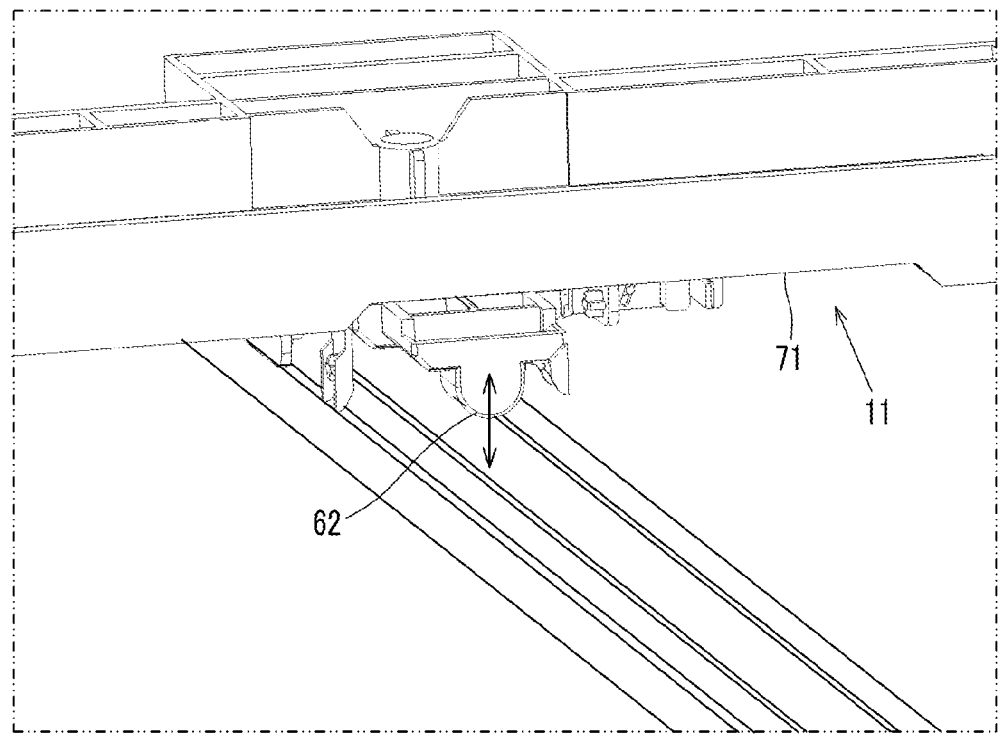
FIG. 7B is a perspective view showing the state where the reading unit is not placed on the guide rail.
Figure 9:
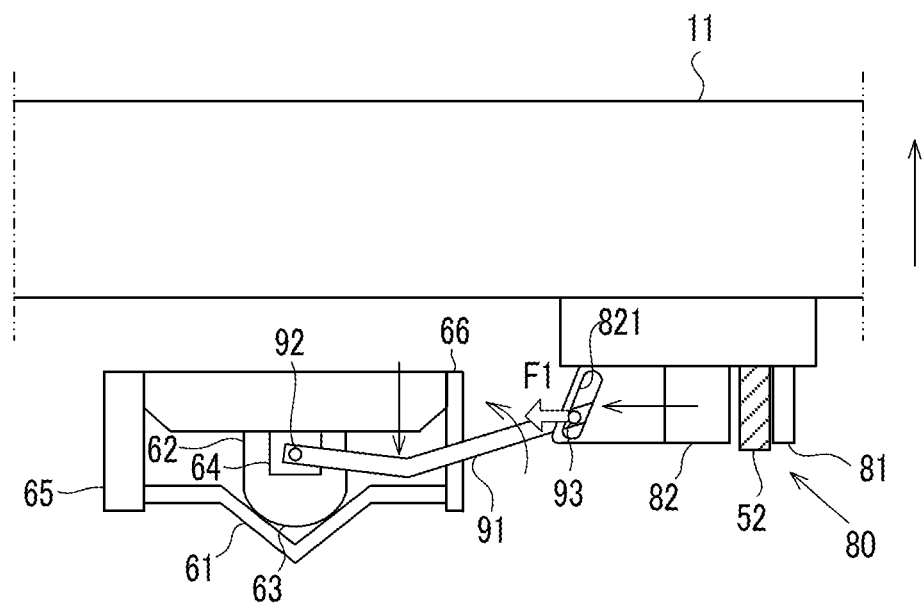
FIG. 9 is a schematic diagram showing the state where the reading unit is in the middle of being lifted.

As shown in FIG. 7B and FIG. 9, when the reading unit 11 is lifted upward, the slider 62 keeps to be on the guide rail 61 for a while, without being lifted upward together with the reading unit 11. This is because the slider 62 can move independently of the reading unit 11 due to the above-described connection configuration of the link member 91 connecting the reading unit 11 and the slider 62, and also because the self-weight acts on the slider 62.

Consequently, the reading unit 11 is separated from the slider 62. The movement of the slider 62 in the longitudinal direction of the reading unit 11 is restricted by the restriction portions 65 and the restriction portions 66. As a result, the slider 62 separates from the reading unit 11 by moving vertically downward relative to the reading unit 11. Therefore an end of the link member 91 on the sway support shaft 92 side is separated from the reading unit 11 vertically downward. With this movement, an end of the link member 91 on the engagement pin 93 side approaches the guide rail 61. At this time, the engagement pin 93 applies a force F1 (see FIG. 9) to the second clamping member 82 so as to move toward the guide rail 61. This allows the second clamping member 82 to be separated from the first clamping member 81 (see FIG. 6A, FIG. 9).

When the second clamping member 82 is separated from the first clamping member 81, the drive belt 52 is released from the clamping by the first clamping member 81 and the second clamping member 82. This leads to the release of the engagement between the engagement mechanism 80 and the drive belt 52, and further to the release of the connection between the reading unit 11 and the drive belt 52. The attitude of the engagement mechanism 80 at this time corresponds to the release attitude. Subsequently, when the reading unit 11 is lifted by a certain amount, the slider 62 is separated from the guide rail 61, and the guide rail 61 is pulled out from between the restriction portions 65 and the restriction portions 66. In this way, the worker can easily detach the reading unit 11 from the image reading portion 10.

On the other hand, when the reading unit 11 is attached to the image reading portion 10, the first clamping member 81 and the second clamping member 82 are disposed on both sides of the drive belt 52. In addition, the worker positions the guide rail 61 and the slider 62 such that the guide rail 61 is positioned between the restriction portions 65 and the restriction portions 66. In that state, the worker lowers the reading unit 11. With this lowering of the reading unit 11, the slider 62 moves vertically upward relative to the reading unit 11 and approaches the reading unit 11. As a result, an end of the link member 91 on the sway support shaft 92 side approaches the reading unit 11 from below. With this movement, an end of the link member 91 on the engagement pin 93 side moves in a direction to be separated from the slider 62. At this time, the engagement pin 93 applies a force opposite to the force F1 shown in FIG. 9 to the second clamping member 82. This allows the second clamping member 82 to approach the first clamping member 81. Thereafter, when the second clamping member 82 and the first clamping member 81 are closest to each other, they clamp the drive belt 52. With this clampling, the engagement mechanism 80 is engaged with the drive belt 52, and the reading unit 11 is connected with the drive belt 52. The attitude of the engagement mechanism 80 at this time corresponds to the engagement attitude. In this way, the worker can easily attach the reading unit 11 to the image reading portion 10.

As described above, the engagement mechanism 80, attached to the reading unit 11, is configured to change between the engagement attitude and the release attitude, wherein in the engagement attitude, the engagement mechanism 80 is engaged with the drive belt 52, and in the release attitude, the engagement between the engagement mechanism 80 and the drive belt 52 is released. In addition, when the slider 62 relatively approaches the reading unit 11, the link mechanism 90 causes the engagement mechanism 80 to be in the engagement attitude; and when the slider 62 relatively separates from the reading unit 11, the link mechanism 90 causes the engagement mechanism 80 to be in the release attitude.

As described above, according to the present embodiment, it is possible to improve the working efficiency of the attachment/detachment of the reading unit 11 with respect to the image reading portion 10.

In the present embodiment, when the reading unit 11 is lifted upward, the slider 62 keeps to be on the guide rail 61 for a while due to the self-weight, without being lifted upward together with the reading unit 11. However, not limited to this configuration, it may be configured such that, for example, a pressing spring (not shown) in the compressed state is disposed between the slider 62 and the reading unit 11, and by the biasing force of the pressing spring, the slider 62 keeps to be on the guide rail 61 for a while.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
   a reading unit having an optical element for reading an image from a document sheet;
   a slide member configured to abut on and separate from a bottom portion of the reading unit, and when abutting on the bottom portion, support the bottom portion of the reading unit;
   a guide rail provided on a device main body, and configured to support the slide member such that the reading unit supported by the slide member can slide in a predetermined movement direction;
   a transmission member extended long in suspension along the movement direction and configured to give the reading unit a force that causes the reading unit to slide;
   an engagement mechanism attached to the reading unit and configured to change in attitude between an engagement attitude to make an engagement between the engagement mechanism and the transmission member, and a release attitude to release the engagement between the engagement mechanism and the transmission member; and
   a link mechanism including a link member that links the slide member with the engagement member, and configured to, when the slide member relatively approaches the reading unit, cause the engagement mechanism to be in the engagement attitude, and when the slide member relatively separates from the reading unit, cause the engagement mechanism to be in the release attitude.

2. The image reading device according to claim 1, wherein
   the transmission member includes a belt,
   the engagement mechanism includes a pair of clamping members that can change in state between an approached state in which the clamping members are approached to each other, and a separate state in which the clamping members are separated from each other,
   the link member is attached to one of the clamping members, and
   when the slide member relatively approaches the reading unit, the link mechanism causes the clamping members to be in the approached state so as to clamp the belt, and when the slide member relatively separates from the reading unit, the link mechanism causes the clamping members to be in the separate state so as to release the belt from clamping by the clamping members.

3. The image reading device according to claim 2, wherein a pressing spring in a compressed state is disposed between the slide member and the reading unit.

4. An image forming apparatus comprising the image reading device according to claim 1.

* * * * *